(No Model.)
S. STEPHENS.
GATE.
No. 347,898. Patented Aug. 24, 1886.
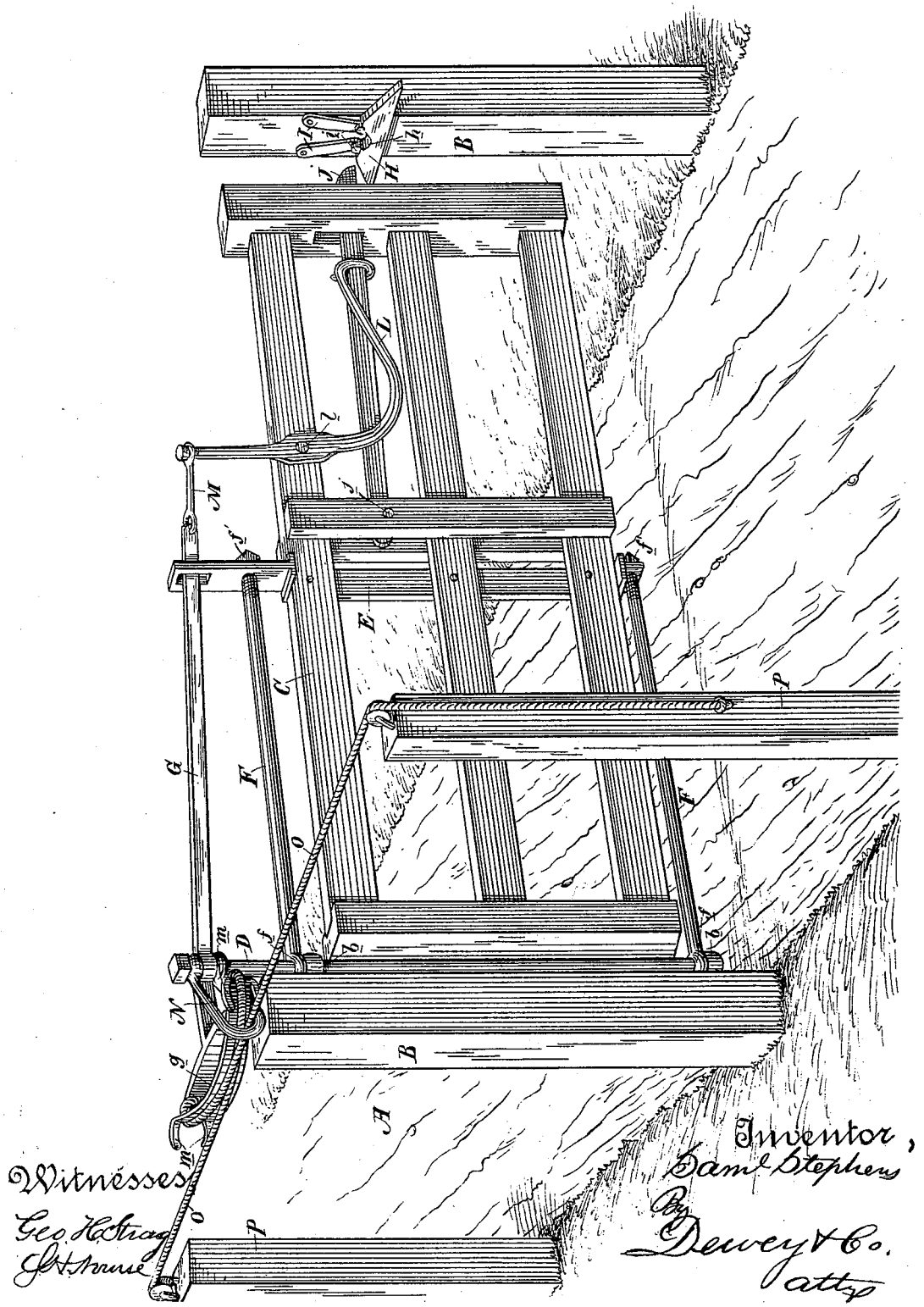

UNITED STATES PATENT OFFICE.

SAMUEL STEPHENS, OF CENTRAL HOUSE, CALIFORNIA.

GATE.

SPECIFICATION forming part of Letters Patent No. 347,898, dated August 24, 1886.

Application filed March 30, 1886. Serial No. 197,225. (No model.)

*To all whom it may concern:*

Be it known that I, SAMUEL STEPHENS, of Central House, in the county of Butte and State of California, have invented an Improvement in Gates; and I hereby declare the following to be a full, clear, and exact description thereof.

My invention relates to that class of gates which are so arranged as to be opened and closed by the approaching and retiring traveler, without putting him to the necessity of alighting from his vehicle; and my invention consists in the novel means for hinging the gate, whereby it is prevented from sagging, and the arrangement of devices for releasing the latch and turning the gate, all of which I shall hereinafter fully describe by reference to the accompanying drawing, in which the figure is a perspective view of my gate.

The object of my invention is to provide an automatic gate, simple in construction, and effective in operation.

A is the roadway, on each side of which are planted the gate-posts B, to one of which the gate is hinged, and to the other of which it is latched.

C is the gate, of any ordinary construction. In the gate-post B to which the gate is hinged are secured bearings $b$, through which passes the vertical pintle D. Secured vertically to the gate about midway of its length is a bar, E, the ends of which project above and below the gate, as shown.

F are hinge-rods, one end of each being provided with an eye or loop, $f$, which rests upon the bearings $b$ and receives the vertical pintle. The other ends of the rods pass through the upper and lower ends of the vertical bar E and are secured by nuts $f'$. This forms the hinge of the gate, the advantage of which rests in its length, which serves to sustain the gate at the middle and prevent it from sagging.

Upon the upper end of the pintle is pivoted a lever, G, the outer end of which has a curved cross-head, $g$, while the inner end is made of a springy nature, and passes through a guide-hole in the top of the vertical bar E.

Upon the gate-post B to which the gate is latched is secured the bevel-ended catch H, provided with a central socket, $h$. To the post near each edge are pivoted the depending gravity-guards I, the lower ends of which are provided with feet $i$, which rest upon the catch on each side of its central socket.

J is a latch pivoted to the gate at $j$, and having its end projecting and adapted to fit within the socket of the catch.

L is a bent lever, pivoted to the gate at $l$, and having its lower arm engaging the latch. Its upper arm extends above the gate, and has connected with it a link, M, the other end of which is connected with the projecting spring end of the lever G.

N is a guide-loop pivoted to the top of the pintle, and embracing the cross-head of the lever. The ends of said cross-head are provided with small guides $m$.

O are ropes, chains, or cables. One of these is attached to the end of the cross-head of the lever G, and thence extends backwardly through the guides $m$ and the loop N, and leads to a post, P, by the roadside, at a suitable distance, over which it is guided by a pulley, and hangs down within reach of the traveler. The other rope is oppositely arranged, and extends to the opposite post P.

By setting up the nuts $f'$ on the ends of the rods F, the hinge of the gate may be tightened up when needed.

The operation of the gate is as follows: The traveler approaching seizes and draws upon the nearest rope. The immediate effect of this is to bend or curve the spring end of the lever G, and in thus bending it shortens up, whereby it pulls back on link M, and this, through the bent lever L, raises the latch J above the feet of the guards I. The gate being released from the latch, thereupon swings open, by reason of the pressure of the lever G upon the vertical bar E. After the traveler has passed he pulls on the other rope and swings the gate to a closed position. The latch, meeting the foot of the guard I, swings it forward until, dropping into the socket $h$, it allows the guard to swing back to its place.

I am aware that many gates open by means of ropes which are arranged first to raise the latch and then to swing the gate, and I do not claim this, broadly, confining myself to the construction I have described, especially the spring-ended lever G, the bending of which effects the necessary result in a simple manner.

Having thus described my invention, what

I claim as new, and desire to secure by Letters Patent, is—

1. The gate C, having the vertical bar E, secured to it about its center, in combination with the vertical pintle D of the gate-post, and the hinge-rods F, secured to the ends of the bar E and pivoted on the pintle, substantially as described.

2. The gate C, having the vertical bar E, secured to it about its center, in combination with the vertical pintle D of the gate post, the hinge-rods F, pivoted on the pintle and having their ends passing through the ends of bar E, and the nuts $f'$ on the ends of the rods for adjusting them, substantially as described.

3. The gate C, the vertical bar E, secured to it near its center, and the rods F, secured to the ends of the bar and having eyes or loops $f$, in combination with the gate-post B, having bearings $b$, on which the eyes or loops of rods F rest, and the pintle D, passing through said eyes or loops and the bearings, substantially as described.

4. The hinged gate C, having the pivoted latch J, in combination with the lever L, the pivoted lever G, having a spring end secured to said lever L, and the ropes or cables secured to the opposite end of the lever G, substantially as herein described.

5. The gate C, having a vertical bar, E, and the pivoted latch J, in combination with the pivoted lever G, having one end a spring and passing through the bar E, the pivoted bent lever L, secured to the latch, and the link M, connecting said lever with the spring end of lever G, and ropes or cables attached to the other end of lever G, substantially as described.

6. The hinged gate C, having bar E and pivoted latch J, in combination with the pivoted lever G, having a spring end passing through bar E, and a cross-head, $g$, on its other end, the pivoted bent lever L, attached to the latch, the link M, connecting the bent lever with the spring end of lever G, and the ropes O, attached to the cross-head $g$ of said lever, substantially as described.

7. The gate C, having a vertical bar, E, and a pivoted latch, J, the hinge-rods F, and the pintle D on the gate-post, in combination with the lever G, pivoted on the pintle and having one end a spring passing through bar E, and a cross-head, $g$, on its other end, the pivoted bent lever L, attached to the latch, the link M, connecting said lever with the spring end of lever G, and the ropes O, secured to the cross-head and suitably guided, substantially as described.

8. The gate C, the hinge-pintle D of the gate-post, and the pivoted lever G, by which the gate is operated, and having cross-head $g$, in combination with the ropes O, secured to the lever, and the loop N on the pintle, and embracing the cross-head for guiding the ropes, substantially as herein described.

In witness whereof I have hereunto set my hand.

SAMUEL STEPHENS.

Witnesses:
PHILIP HEFNER,
FRANK S. HEFNER.